United States Patent
Yoshimitsu et al.

(10) Patent No.: US 10,651,751 B2
(45) Date of Patent: May 12, 2020

(54) SWITCHING POWER SUPPLY DEVICE

(71) Applicant: Yazaki Corporation, Tokyo (JP)

(72) Inventors: Shota Yoshimitsu, Shizuoka (JP); Satoshi Ito, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/352,804

(22) Filed: Mar. 13, 2019

(65) Prior Publication Data
US 2019/0312520 A1   Oct. 10, 2019

(30) Foreign Application Priority Data

Apr. 4, 2018   (JP) .................... 2018-072192

(51) Int. Cl.
| | |
|---|---|
| *H02M 1/34* | (2007.01) |
| *H02M 1/00* | (2006.01) |
| *H02M 3/335* | (2006.01) |
| *H02M 3/337* | (2006.01) |

(52) U.S. Cl.
CPC ......... *H02M 3/33592* (2013.01); *H02M 1/34* (2013.01); *H02M 3/3353* (2013.01); *H02M 3/337* (2013.01); *H02M 2001/0009* (2013.01); *H02M 2001/346* (2013.01)

(58) Field of Classification Search
CPC .. H02M 1/34; H02M 3/3353; H02M 3/33592; H02M 2001/0009
See application file for complete search history.

(56) References Cited

U.S. PATENT DOCUMENTS

| | | | |
|---|---|---|---|
| 9,065,341 B2* | 6/2015 | Murakami | ........ H02M 3/33507 |
| 2013/0301304 A1 | 11/2013 | Murakami et al. | |
| 2017/0003337 A1 | 1/2017 | Bito et al. | |
| 2018/0102709 A1 | 4/2018 | Hari et al. | |
| 2019/0074765 A1 | 3/2019 | Hari et al. | |
| 2019/0334430 A1* | 10/2019 | Higashiyama | .......... H02M 1/34 |

FOREIGN PATENT DOCUMENTS

| | | |
|---|---|---|
| JP | 2015-70716 A | 4/2015 |
| JP | 2017-17822 A | 1/2017 |
| TW | M557846 U | 4/2018 |

* cited by examiner

*Primary Examiner* — Daniel Kessie
*Assistant Examiner* — Sisay G Tiku
(74) *Attorney, Agent, or Firm* — Kenealy Vaidya LLP

(57) ABSTRACT

In a switching power supply device, a snubber circuit includes a snubber capacitor, a FET, and a snubber inductor. The snubber capacitor stores therein surge power due to a reverse recovery time of FETs. The FET discharges the surge power stored in the snubber capacitor. The snubber inductor is provided in a stage following the FET. The controller controls an actual on-duty at which the FET of the snubber circuit is turned on based on the surge power. The controller can set an on-duty lower limit indicating the lower limit of the actual on-duty. The on-duty lower limit is smaller than the actual on-duty set for the FET in a continuous current mode in which an electric current flowing through the snubber inductor continuously flows and larger than 0.

6 Claims, 6 Drawing Sheets

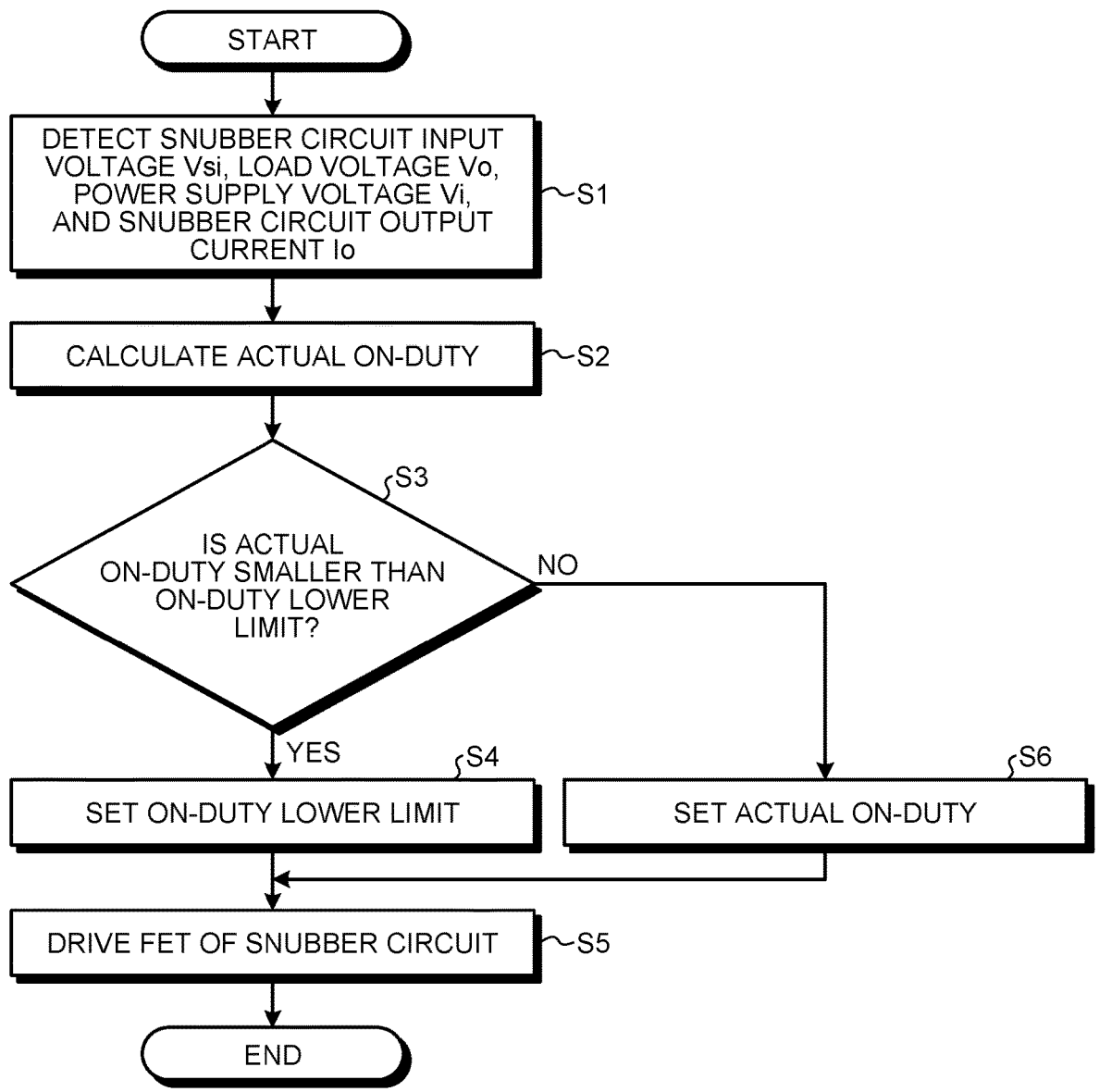

SWITCHING POWER SUPPLY DEVICE

CROSS-REFERENCE TO RELATED APPLICATION(S)

The present application claims priority to and incorporates by reference the entire contents of Japanese Patent Application No. 2018-072192 filed in Japan on Apr. 4, 2018.

BACKGROUND OF THE INVENTION

1. Field of the Invention

The present invention relates to a switching power supply device.

2. Description of the Related Art

Conventionally developed are switching power supply devices, including a DC/DC converter that transforms the voltage of a direct current (DC) disclosed in Japanese Patent Application Laid-open No. 2015-70716, for example. The DC/DC converter converts DC power supplied from a DC power supply into alternating-current (AC) power by an inverter and transforms the AC power by a transformer. The DC/DC converter rectifies, by a rectifier circuit, the AC power resulting from transformation to generate DC power and smooths and supplies the DC power to a load. In this case, the DC/DC converter may possibly generate surge power by leakage inductance of the transformer, for example. The DC/DC converter includes a snubber circuit to reduce the surge power to be supplied to the load. The snubber circuit, for example, stores the surge power in a capacitor, thereby reducing the surge power to be supplied to the load. If the surge power is stored in the capacitor, the snubber circuit turns on a switching element and supplies the surge power to the load. By contrast, if the surge power is not stored in the capacitor, the snubber circuit turns off the switching element and does not supply the surge power to the load.

The snubber circuit repeatedly turns on and off the switching element depending on the surge amount of the surge power, thereby intermittently operating. As a result, the snubber circuit may possibly generate noise in an audible range. Consequently, the conventional switching power supply devices still have room for improvement.

SUMMARY OF THE INVENTION

In view of the disadvantages described above, the present invention aims to provide a switching power supply device that can suppress noise in an audible range generated by a switching element of a snubber circuit.

A switching power supply device according to one aspect of the present invention includes a switching circuit configured to convert DC power supplied from a DC power supply into AC power; a rectifier circuit including a plurality of rectifier elements configured to rectify the AC power resulting from conversion by the switching circuit; a snubber circuit including a power storage element configured to store therein surge power due to a reverse recovery time of the rectifier elements, a switching element configured to discharge the surge power stored in the power storage element, and an inductor provided in a stage following the switching element; and a controller configured to control an on-duty at which the switching element is turned on based on the surge power, wherein the controller is capable of setting an on-duty lower limit indicating a lower limit of the on-duty, and the on-duty lower limit is smaller than the on-duty set for the switching element in a continuous current mode in which an electric current flowing through the inductor continuously flows and larger than 0.

According to another aspect of the present invention, in the switching power supply device, it is preferable that the on-duty lower limit is equal to or larger than the on-duty of the switching element capable of outputting a snubber current minimum value serving as a minimum value of an electric current output from the snubber circuit.

According to still another aspect of the present invention, in the switching power supply device, it is preferable that, when the on-duty at which the switching element is turned on based on the surge power is smaller than the on-duty lower limit, the controller turns on the switching element at the on-duty lower limit.

According to still another aspect of the present invention, in the switching power supply device, it is preferable that the controller has a discontinuous current mode in which the electric current flowing through the inductor discontinuously flows and is capable of setting the on-duty lower limit in at least the discontinuous current mode.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a flowchart of exemplary control performed on the snubber circuit according to the embodiment.

DETAILED DESCRIPTION OF THE PREFERRED EMBODIMENTS

Exemplary aspects (embodiments) to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. Various omissions, substitutions, and changes in the components may be made without departing from the spirit of the present invention.

EMBODIMENTS

Figure 1:
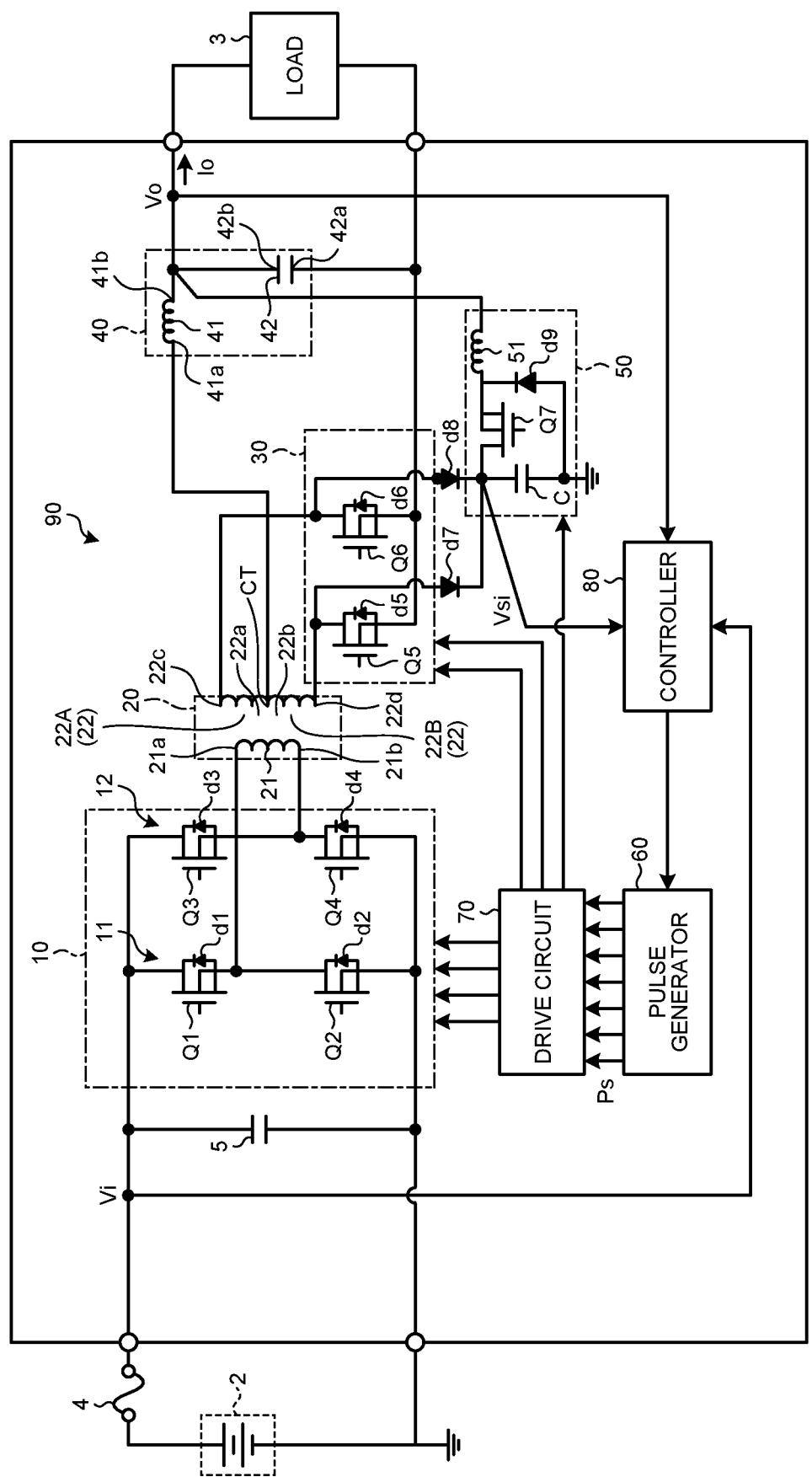
FIG. 1 is a circuit diagram of an exemplary configuration of a switching power supply device according to an embodiment.

A switching power supply device 1 according to an embodiment of the present invention is described. As illustrated in FIG. 1, for example, the switching power supply device 1 is an insulating DC/DC converter that converts the voltage of a DC power supply 2 mounted on a vehicle. The DC power supply 2 supplies DC power. The switching power supply device 1 is provided between the DC power supply 2 and a load 3. The switching power supply device 1 steps down the voltage of electric power supplied from the DC power supply 2 and supplies the electric power to the load 3. The switching power supply device 1 is connected to the DC power supply 2 via a fuse 4, for example. The switching power supply device 1, for example, converts DC power into AC power and steps down the voltage of the AC power by a transformer 20. The switching power supply device 1 rectifies, by a rectifier circuit 30, the AC power resulting from stepping-down to generate DC power and smooths and supplies the DC power to the load 3. In this case, the switching power supply device 1 may possibly generate surge power due to a reverse recovery time caused by a rectifier element of the rectifier circuit 30. At this time, the switching power supply device 1 reduces surge components in output by a snubber circuit 50. The following describes the switching power supply device 1 in greater detail.

The switching power supply device 1 includes a switching circuit 10, the transformer 20 serving as a transformer circuit, the rectifier circuit 30, a smoothing circuit 40, the snubber circuit 50, a pulse generator 60, a drive circuit 70, and a controller 80. The switching circuit 10, the transformer 20, the rectifier circuit 30, and the smoothing circuit 40 serve as a main circuit 90.

The switching circuit 10 is connected to the DC power supply 2 and converts DC power into AC power. The switching circuit 10 is a full-bridge circuit including first to fourth switching elements. The switching circuit 10 includes a field-effect transistor (FET) Q1 serving as the first switching element, a FET Q2 serving as the second switching element, a FET Q3 serving as the third switching element, and a FET Q4 serving as the fourth switching element, for example. The FETs Q1, Q2, Q3, and Q4 are N-channel metal-oxide-semiconductor (MOS) FETs, for example. The FETs Q1 to Q4 each include a parasitic diode (body diode). The FET Q1 includes a parasitic diode d1, the FET Q2 includes a parasitic diode d2, the FET Q3 includes a parasitic diode d3, and the FET Q4 includes a parasitic diode d4, for example.

The switching circuit 10 includes a first series circuit 11 and a second series circuit 12. The first series circuit 11 includes the FET Q1 and the FET Q2. A drain terminal of the FET Q2 is connected in series to a source terminal of the FET Q1. In the first series circuit 11, a drain terminal of the FET Q1 is connected to a cathode of the DC power supply 2, and a source terminal of the FET Q2 is connected to an anode of the DC power supply 2. Consequently, the first series circuit 11 is connected between the cathode and the anode of the DC power supply 2. The second series circuit 12 includes the FET Q3 and the FET Q4. A drain terminal of the FET Q4 is connected in series to a source terminal of the FET Q3. In the second series circuit 12, a drain terminal of the FET Q3 is connected to the cathode of the DC power supply 2, and a source terminal of the FET Q4 is connected to the anode of the DC power supply 2. Consequently, the second series circuit 12 is connected between the cathode and the anode of the DC power supply 2. Furthermore, in the second series circuit 12, the drain terminal of the FET Q3 is connected to the drain terminal of the FET Q1, and the source terminal of the FET Q4 is connected to the source terminal of the FET Q2. Consequently, the second series circuit 12 is connected in parallel to the first series circuit 11. The FETs Q1 to Q4 includes the parasitic diodes d1 to d4, respectively, provided in a direction reverse to a direction in which the AC power flows. The switching circuit 10 converts DC power supplied from the DC power supply 2 into AC power by the FETs Q1 to Q4 and supplies the AC power to a primary winding 21 of the transformer 20. A smoothing capacitor 5 is provided in a stage preceding the switching circuit 10.

The primary winding 21 serves as the transformer 20 together with a secondary winding 22. The primary winding 21 is an inductor that transforms the voltage of AC power. A first end 21a of the primary winding 21 is connected to a connection wire between the source terminal of the FET Q1 and the drain terminal of the FET Q2. A second end 21b of the primary winding 21 is connected to a connection wire between the source terminal of the FET Q3 and the drain terminal of the FET Q4.

The secondary winding 22 is magnetically coupled to the primary winding 21 and serves as the transformer 20 together with the primary winding 21. The secondary winding 22 includes a secondary winding part 22A and a secondary winding part 22B. A first end 22a of the secondary winding part 22A and a first end 22b of the secondary winding part 22B are connected by a center tap CT. The degree of stepping-down performed by the transformer 20 is determined based on the turn ratio (transformation ratio) between the primary winding 21 and the secondary winding 22 (secondary winding parts 22A and 22B). The center tap CT is connected to a cathode of the load 3 via a smoothing inductor 41 and other components of the smoothing circuit 40. In the secondary winding 22, a second end 22c of the secondary winding part 22A is connected to an anode of the load 3 via a FET Q6 (rectifier element) of the rectifier circuit 30. A second end 22d of the secondary winding part 22B is connected to the anode of the load 3 via a FET Q5 (rectifier element) of the rectifier circuit 30.

The rectifier circuit 30 rectifies AC power to generate DC power. The rectifier circuit 30 includes the FET Q5 and the FET Q6. The FET Q5 includes a parasitic diode d5, and the FET Q6 includes a parasitic diode d6. A drain terminal of the FET Q5 is connected to the second end 22d of the secondary winding part 22B, and a source terminal thereof is connected to the anode of the load 3. A drain terminal of the FET Q6 is connected to the second end 22c of the secondary winding part 22A, and a source terminal thereof is connected to the anode of the load 3. The rectifier circuit 30 performs on/off control on the FETs Q5 and Q6, thereby rectifying AC power supplied from the secondary winding 22 to the load 3 to generate DC power. The rectifier circuit 30 supplies the DC power to the load 3 via the smoothing circuit 40.

The smoothing circuit 40 smooths DC power. The smoothing circuit 40 includes the smoothing inductor 41 and a smoothing capacitor 42. A first end 41a of the smoothing inductor 41 is connected to the center tap CT, and a second end 41b thereof is connected to the cathode of the load 3. A first end 42a of the smoothing capacitor 42 is connected to the anode of the load 3, and a second end 42b thereof is connected to the cathode of the load 3. The smoothing circuit 40 smooths DC power (pulsating power) rectified by the rectifier circuit 30 and supplies the smoothed DC power to the load 3.

The snubber circuit 50 reduces surge components of electric power (surge power). The snubber circuit 50 includes a snubber capacitor C serving as a power storage element, a diode d9, a FET Q7, and a smoothing snubber inductor (inductor) 51. The snubber circuit 50 according to the present embodiment stores, in the snubber capacitor C, the surge power due to the reverse recovery time of the parasitic diodes d5 and d6 in the FETs Q5 and Q6 of the rectifier circuit 30, thereby reducing the surge components in output. The snubber capacitor C stores therein electric power and is connected to the FET Q5 via a diode d7. Specifically, a first end of the snubber capacitor C is connected to a cathode terminal of the diode d7, and an anode terminal of the diode d7 is connected to the drain terminal of the FET Q5. Similarly, the snubber capacitor C is connected to the FET Q6 via a diode d8. Specifically, the first end of the snubber capacitor C is connected to a cathode terminal of the diode d8, and an anode terminal of the diode d8 is connected to the drain terminal of the FET Q6.

The FET Q7 is a switching element that switches whether to supply the surge power stored in the snubber capacitor C to the load 3. The FET Q7 is disposed between the snubber capacitor C and the cathode of the load 3. A drain terminal of the FET Q7 is connected to the first end of the snubber capacitor C, and a source terminal thereof is connected to the cathode of the load 3 via the snubber inductor 51. The FET Q7 is turned on by the controller 80, which will be described later, thereby supplying and regenerating the surge power stored in the snubber capacitor C to the load 3. The FET Q7 is turned off by the controller 80, thereby storing the surge power in the snubber capacitor C.

The snubber inductor 51 serves as a snubber smoothing circuit together with the smoothing capacitor 42. A first end of the snubber inductor 51 is connected to the source terminal of the FET Q7, and a second end thereof is connected to a connection of the smoothing capacitor 42 and the cathode of the load 3. When the FET Q7 is turned on, the snubber smoothing circuit smooths the electric power supplied from the snubber capacitor C and supplies it to the load 3.

The pulse generator 60 generates drive pulse signals Ps for driving the switching circuit 10, the rectifier circuit 30, and the snubber circuit 50. The pulse generator 60 is connected to the drive circuit 70 and the controller 80. The pulse generator 60 outputs, to the drive circuit 70, the drive pulse signals Ps generated based on control signals output from the controller 80.

The drive circuit 70 drives the switching circuit 10, the rectifier circuit 30, and the snubber circuit 50. The drive circuit 70, for example, drives the FETs Q1 to Q4 of the switching circuit 10, the FETs Q5 and Q6 of the rectifier circuit 30, and the FET Q7 of the snubber circuit 50. The drive circuit 70 is connected to the pulse generator 60 and receives the drive pulse signals Ps output from the pulse generator 60. The drive circuit 70 drives the switching circuit 10, the rectifier circuit 30, and the snubber circuit 50 based on the drive pulse signals Ps.

Figure 2:
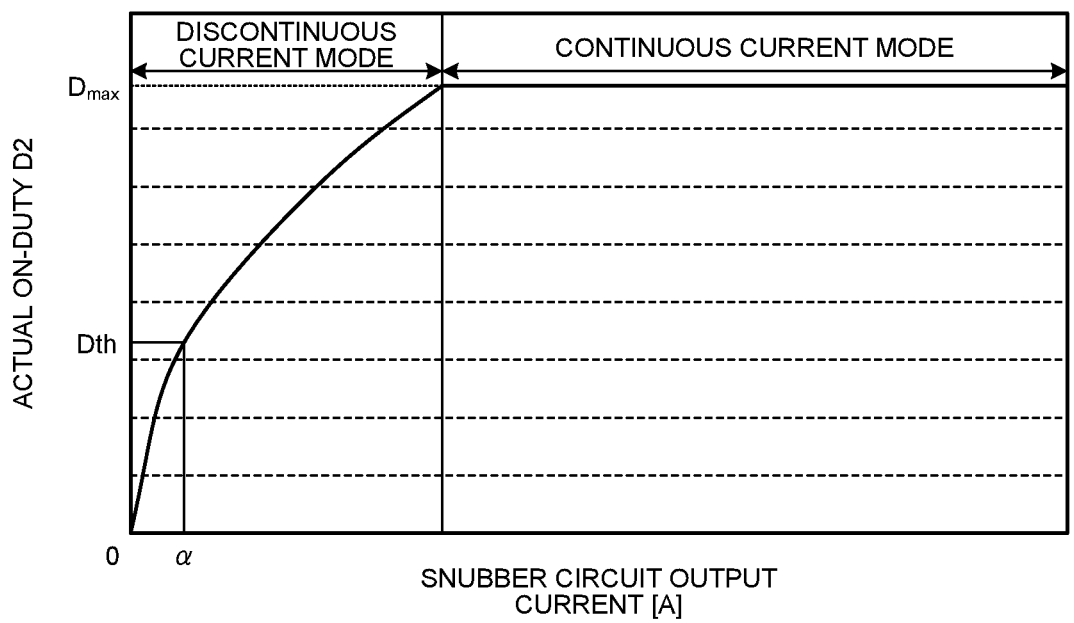
FIG. 2 is a diagram of on-duty in a continuous current mode and a discontinuous current mode according to the embodiment.

The controller 80 controls the switching circuit 10, the rectifier circuit 30, and the snubber circuit 50. The controller 80, for example, includes an electronic circuit mainly provided by a known microcomputer including a central processing unit (CPU), a read-only memory (ROM) and a random access memory (RAM) serving as a storage unit, and an interface. The ROM stores therein software for controlling various circuits and set values for the various circuits, for example. The ROM stores therein an on-duty lower limit Dth indicating the lower limit of on-duty of the FET Q7 of the snubber circuit 50, for example. The on-duty is the ratio of a pulse width for turning on a switching element, such as the FET Q7, to one pulse period in a pulse signal for controlling the switching element. As illustrated in FIG. 2, the on-duty lower limit Dth is smaller than an actual on-duty D2 (Dmax) set for the FET Q7 in a continuous current mode in which an electric current flowing through the snubber inductor 51 of the snubber circuit 50 continuously flows and larger than 0. In other words, the on-duty lower limit Dth is set smaller than the step-down ratio (load voltage Vo/snubber circuit input voltage Vsi) in the continuous current mode. With this mechanism, if the on-duty lower limit Dth is set, the controller 80 can prevent an electric current flowing from the DC power supply 2 to the load 3 via the main circuit 90 from flowing through the snubber circuit 50. Consequently, the switching power supply device 1 can suppress loss of the electric power supplied from the DC power supply 2 to the load 3. The on-duty lower limit Dth is preferably smaller than the actual on-duty D2 (Dmax) set for the FET Q7 in the continuous current mode and equal to or larger than the actual on-duty D2 of the FET Q7 capable of outputting a snubber current minimum value α, which is the minimum value of an electric current output from the snubber circuit 50. The on-duty lower limit Dth is more preferably equal to the actual on-duty D2 of the FET Q7 capable of outputting the snubber current minimum value α from the snubber circuit 50. The snubber current minimum value α is appropriately determined based on the performance of the components, such as the FET Q7, of the snubber circuit 50.

The controller 80 applies a voltage to gate terminals of the FETs Q1 to Q4 of the switching circuit 10, thereby performing on/off control. The controller 80 thus performs control so as to convert DC power into AC power. The controller 80 also applies a voltage to gate terminals of the FETs Q5 and Q6 of the rectifier circuit 30, thereby performing on/off control. The controller 80 thus performs control so as to rectify AC power. When the FETs Q5 and Q6 of the rectifier circuit 30 are switched from on to off, the switching power supply device 1 generates the reverse recovery time in which an electric current flows in the reverse direction by carriers accumulated in the parasitic diodes d5 and d6 of the FETs Q5 and Q6 of the rectifier circuit 30. At this time, the switching power supply device 1 generates the voltage of surge power (surge voltage) between the second end 22c of the secondary winding part 22A and the second end 22d of the secondary winding part 22B of the transformer 20. In other words, the surge power is supplied by the carriers accumulated in the parasitic diodes d5 and d6 at the timing when the FETs Q5 and Q6 of the rectifier circuit 30 are switched from on to off and is large power exceeding the stationary power. To address this, the controller 80 controls the snubber circuit 50 and reduces the surge components in output.

The controller 80 is connected to the cathode of the DC power supply 2 and detects a power supply voltage Vi applied from the DC power supply 2. The controller 80 is also connected to the cathode of the load 3 and detects the load voltage Vo and a snubber circuit output current Io to be applied to the load 3. The controller 80 is also connected to the snubber capacitor C and detects the snubber circuit input voltage Vsi to be applied to the snubber capacitor C. The controller 80 controls the snubber circuit 50 based on the power supply voltage Vi, the load voltage Vo, the snubber circuit output current Io, and the snubber circuit input voltage Vsi.

Figure 3:
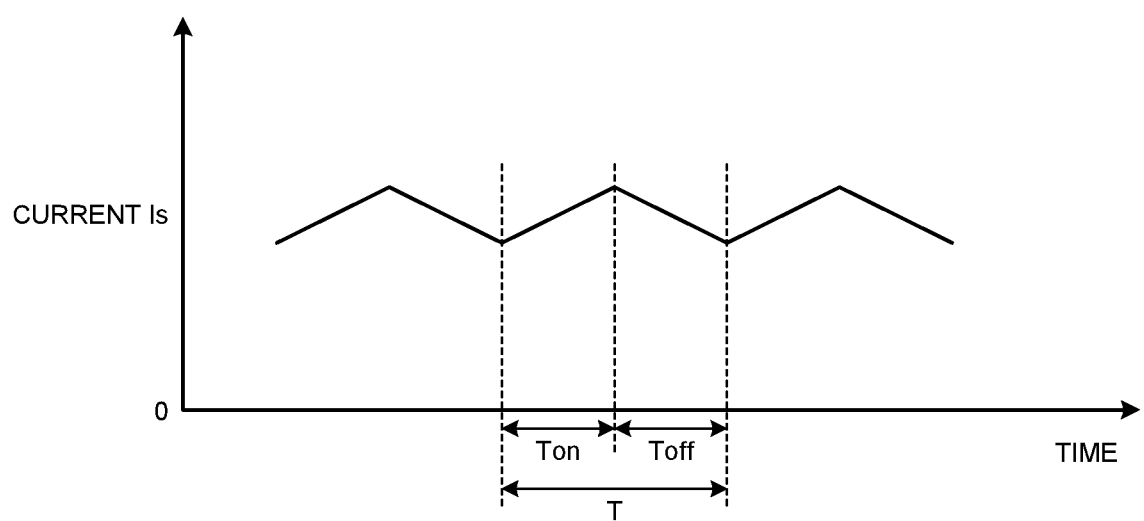
FIG. 3 is a diagram of a waveform of an electric current flowing through a snubber inductor in the continuous current mode according to the embodiment.
Figure 4:
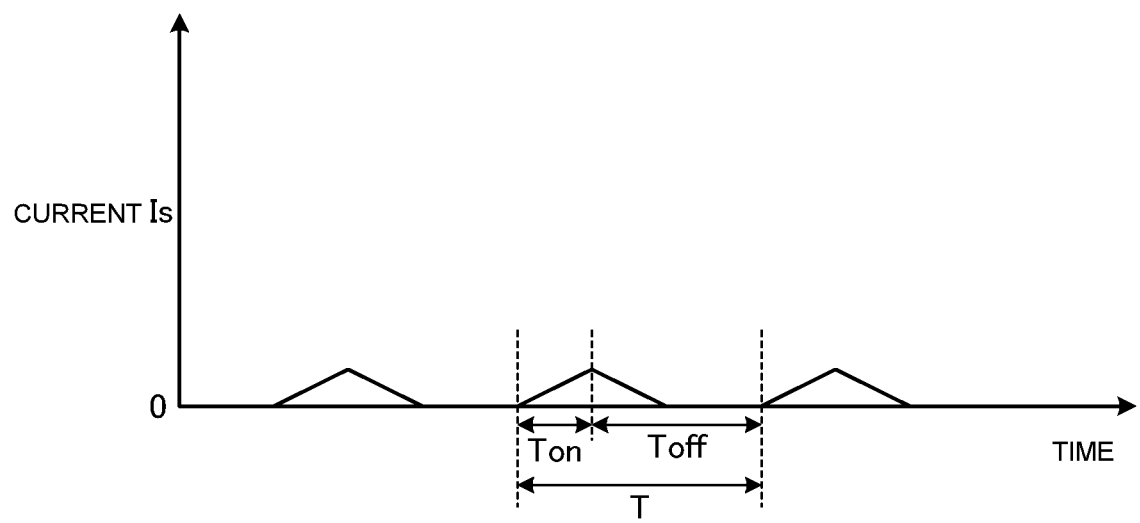
FIG. 4 is a diagram of a waveform of an electric current flowing through the snubber inductor in the discontinuous current mode according to the embodiment.
Figure 5:
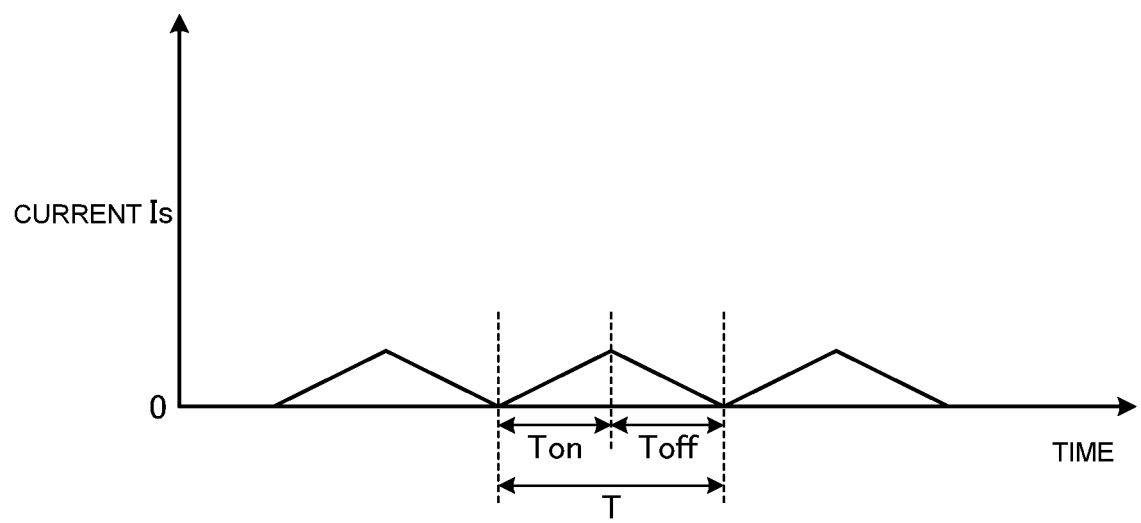
FIG. 5 is a diagram of a waveform of an electric current flowing through the snubber inductor in a critical current mode according to the embodiment.

The controller 80 calculates a critical on-duty D1, which is on-duty in a critical current mode, by Expression (1). The controller 80 has the continuous current mode (refer to FIG. 3), a discontinuous current mode (refer to FIG. 4), and the critical current mode (refer to FIG. 5). In the continuous current mode, the electric current flowing through the snubber inductor 51 of the snubber circuit 50 continuously flows. In the discontinuous current mode, the electric current flowing through the snubber inductor 51 of the snubber circuit 50 discontinuously flows. The critical current mode indicates the boundary between the continuous current mode and the discontinuous current mode. In Expression (1), Vsi is the snubber circuit input voltage, Io is the snubber circuit output current, T is the sum of an on-width Ton and an off-width Toff of a waveform of an electric current Is flowing through the snubber inductor 51, Ton is the on-width Ton of the waveform of the electric current Is, and L is inductance of the snubber inductor 51.

$$D1 = \frac{V_{si}T_{on}^2}{V_{si}T_{on}^2 + 2LI_oT} \tag{1}$$

The controller 80 calculates the measured actual on-duty D2 by Expression (2). In Expression (2), Vo is the load voltage, and Vi is the power supply voltage.

$$D2 = Vo/Vi \tag{2}$$

The controller 80 determines whether the snubber circuit 50 is in the continuous current mode or the discontinuous current mode based on the critical on-duty D1 and the actual on-duty D2. If the actual on-duty D2 is equal to or larger than the critical on-duty D1, for example, the controller 80 determines that the snubber circuit 50 is in the continuous current mode illustrated in FIG. 3. If the actual on-duty D2 is smaller than the critical on-duty D1, the controller 80 determines that the snubber circuit 50 is in the discontinuous current mode illustrated in FIG. 4.

If the snubber circuit 50 is in the continuous current mode, the controller 80 calculates the load voltage Vo based on Expression (3). In Expression (3), D2 is the actual on-duty, and Vsi is the snubber circuit input voltage.

$$Vo = D2 \times Vsi \tag{3}$$

If the snubber circuit 50 is in the discontinuous current mode, the controller 80 calculates the load voltage Vo based on Expression (4). In Expression (4), Vsi is the snubber circuit input voltage, Io is the snubber circuit output current, T is the sum of the on-width Ton and the off-width Toff of the waveform of the electric current Is flowing through the snubber inductor 51, Ton is the on-width Ton of the waveform of the electric current Is, and L is the inductance of the snubber inductor 51.

$$V_o = \frac{(V_{si}T_{on})^2}{V_{si}T_{on}^2 + 2I_oLT} \tag{4}$$

The controller 80 calculates the actual on-duty D2 in the continuous current mode based on Expression (2).

The controller 80 derives Expression (5) for calculating the actual on-duty D2 in the discontinuous current mode based on Expressions (3) and (4). In Expression (5), Vsi is the snubber circuit input voltage, Io is the snubber circuit output current, T is the sum of the on-width Ton and the off-width Toff of the waveform of the electric current Is flowing through the snubber inductor 51, Ton is the on-width Ton of the waveform of the electric current Is, and L is the inductance of the snubber inductor 51.

$$D2 = \frac{T_{on}}{T} = \frac{1}{T}\sqrt{\frac{2I_oV_oLT}{V_{si}^2 - V_{si}V_o}} \tag{5}$$

The controller 80 compares the actual on-duty D2 with the on-duty lower limit Dth. If the actual on-duty D2 is equal to or larger than the on-duty lower limit Dth, the controller 80 outputs control signals for turning on the FET Q7 at the actual on-duty D2 to the pulse generator 60. If the actual on-duty D2 is smaller than the on-duty lower limit Dth, the controller 80 outputs control signals for turning on the FET Q7 at the on-duty lower limit Dth to the pulse generator 60. Consequently, when the surge power is relatively small, the controller 80 can drive the switching element at the on-duty lower limit Dth, thereby suppressing intermittent operations of the FET Q7 of the snubber circuit 50.

Figure 6:
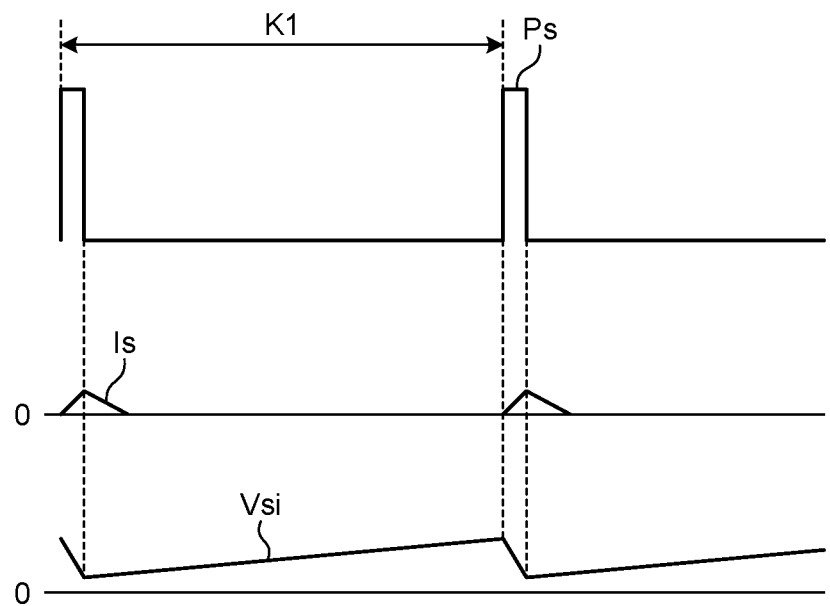
FIG. 6 is a sequence chart of an exemplary operation (with no on-duty lower limit) performed by a snubber circuit according to a comparative example.

In a snubber circuit according to a comparative example (not illustrated), the on-duty lower limit Dth is not set. As a result, a FET of the snubber circuit may possibly intermittently operate as illustrated in FIG. 6. The snubber circuit according to the comparative example is turned on when the snubber circuit input voltage Vsi is equal to or higher than a certain value. When the surge power is relatively small like in the discontinuous current mode, a period K1 of the drive pulse signals Ps for turning on the FET is made longer than a period of a desired switching frequency. As a result, the snubber circuit may possibly generate noise in an audible range (approximately 20 Hz to 20 KHz). In the snubber circuit according to the comparative example, the electric current Is flows through the snubber inductor 51 as illustrated in FIG. 6.

Figure 7:
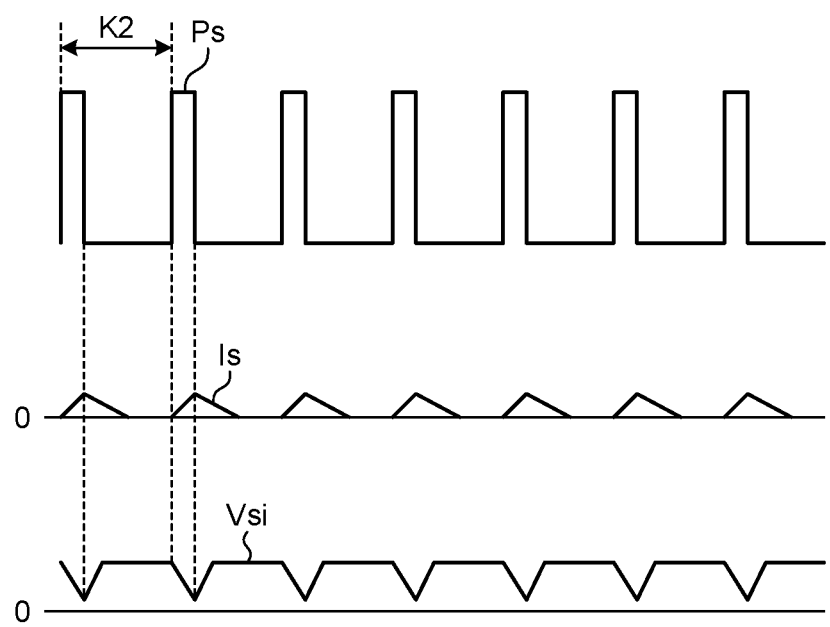
FIG. 7 is a sequence chart of an exemplary operation (with an on-duty lower limit) performed by the snubber circuit according to the embodiment.

By contrast, in the snubber circuit 50 according to the embodiment, the on-duty lower limit Dth is set. When the surge power is relatively small like in the discontinuous current mode as illustrated in FIG. 7, the snubber circuit 50 operates at the on-duty lower limit Dth. As a result, a period K2 of the drive pulse signals Ps for turning on the FET Q7 is made equal to a period of a desired switching frequency, whereby the snubber circuit 50 can suppress noise in an audible range (approximately 20 Hz to 20 KHz). In the snubber circuit 50, the electric current Is flows through the snubber inductor 51 as illustrated in FIG. 7.

Figure 8:
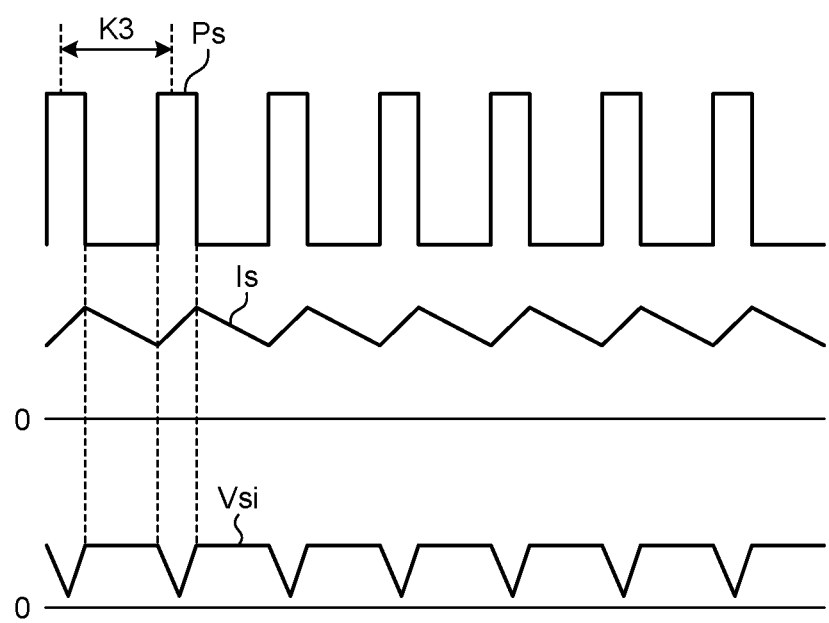
FIG. 8 is a sequence chart of an exemplary operation (continuous current mode) performed by the snubber circuit according to the embodiment.

When the surge power is relatively large like in the continuous current mode as illustrated in FIG. 8, a period K3 of the drive pulse signals Ps for turning on the FET Q7 is made equal to a period of a desired switching frequency, whereby the snubber circuit 50 generates no noise in an audible range (approximately 20 Hz to 20 KHz). In the snubber circuit 50, the electric current Is flows through the snubber inductor 51 as illustrated in FIG. 8.

The following describes an exemplary operation of stepping down the voltage performed by the switching power supply device 1. The controller 80 of the switching power supply device 1 turns on the FETs Q1 and Q4 of the switching circuit 10 and turns off the FETs Q2 and Q3 of the switching circuit 10. The controller 80 then causes an electric current to flow from the first end 21a to the second end 21b of the primary winding 21 of the transformer 20. The controller 80 turns off the FETs Q1 and Q4 of the switching circuit 10 and turns on the FETs Q2 and Q3 of the switching circuit 10. The controller 80 then causes an electric current to flow from the second end 21b to the first end 21a of the primary winding 21 of the transformer 20. The controller 80 repeatedly performs the control described above, thereby converting DC power supplied from the DC power supply 2 into AC power and supplying the AC power to the primary winding 21 of the transformer 20. If the AC power is supplied to the primary winding 21 of the transformer 20, induced electromotive force is generated in the secondary winding 22 of the transformer 20 by electromagnetic induction. The transformer 20 steps down the voltage of the AC power based on the turn ratio between the primary winding 21 and the secondary winding 22. The rectifier circuit 30 rectifies the AC power resulting from stepping-down by the transformer 20 into DC power. At this time, the controller 80 turns on the FETs Q5 and Q6 synchronously with a period for applying a forward voltage to the parasitic diodes d5 and d6 of the rectifier circuit 30. The smoothing circuit 40 smooths the DC power rectified by the rectifier circuit 30 and supplies it to the load 3. If the snubber circuit 50 is in the continuous current mode, the switching power supply device 1 turns on the FET Q7 of the snubber circuit 50 based on the actual on-duty D2 calculated by Expression (2). By contrast, if the snubber circuit 50 is in the discontinuous current mode, the switching power supply device 1 turns on the FET Q7 of the snubber circuit 50 based on the actual on-duty D2 calculated by Expression (5). If the actual on-duty D2 of the snubber circuit 50 is smaller than the on-duty lower limit Dth, the switching power supply device 1 turns on the FET Q7 at the on-duty lower limit Dth.

The following describes specific exemplary control performed on the snubber circuit 50 with reference to FIG. 9. The controller 80 detects the snubber circuit input voltage Vsi, the load voltage Vo, the power supply voltage Vi, and the snubber circuit output current Io (Step S1). Subsequently, the controller 80 calculates the actual on-duty D2 (Step S2). If the snubber circuit 50 is in the continuous current mode, for example, the controller 80 calculates the actual on-duty D2 by Expression (2). If the snubber circuit 50 is in the discontinuous current mode, the controller 80 calculates the actual on-duty D2 by Expression (5). Subsequently, the controller 80 determines whether the actual on-duty D2 is smaller than the on-duty lower limit Dth (Step S3). If the actual on-duty D2 is smaller than the on-duty lower limit Dth (Yes at Step S3), the controller 80 sets the on-duty lower limit Dth for the FET Q7 of the snubber circuit 50 (Step S4). The controller 80, for example, outputs control signals for turning on the FET Q7 at the on-duty lower limit Dth to the pulse generator 60. Based on the control signals, the pulse generator 60 generates the drive pulse signals Ps. Subsequently, the drive circuit 70 drives the FET Q7 of the snubber circuit 50 based on the drive pulse signals Ps generated by the pulse generator 60 (Step S5). If the actual on-duty D2 is equal to or larger than the on-duty lower limit Dth at Step S3 (No at Step S3), the controller 80 sets the actual on-duty D2 calculated at Step S2 for the FET Q7 of the snubber circuit 50 (Step S6).

As described above, the switching power supply device 1 according to the embodiment includes the switching circuit 10, the rectifier circuit 30, the snubber circuit 50, and the controller 80. The switching circuit 10 converts DC power supplied from the DC power supply 2 into AC power. The rectifier circuit 30 includes the FETs Q5 and Q6 that rectify the AC power resulting from conversion by the switching circuit 10. The snubber circuit 50 includes the snubber capacitor C, the FET Q7, and the snubber inductor 51. The snubber capacitor C stores therein surge power due to a reverse recovery time of the FETs Q5 and Q6. The FET Q7 discharges the surge power stored in the snubber capacitor C. The snubber inductor 51 is provided in a stage following the FET Q7. The controller 80 controls the actual on-duty D2 at which the FET Q7 of the snubber circuit 50 is turned on based on the surge power. The controller 80 can set the on-duty lower limit Dth indicating the lower limit of the actual on-duty D2. The on-duty lower limit Dth is smaller than the actual on-duty D2 set for the FET Q7 in the continuous current mode in which an electric current flowing through the snubber inductor 51 continuously flows and larger than 0.

With this configuration, when the surge power is relatively small, the switching power supply device 1 can drive the FET Q7 of the snubber circuit 50 at the on-duty lower limit Dth. In other words, when the surge power is relatively small, the switching power supply device 1 can cause the FET Q7 of the snubber circuit 50 to operate at a desired switching frequency. With this configuration, the switching power supply device 1 can suppress intermittent operations of the FET Q7 of the snubber circuit 50. Consequently, the switching power supply device 1 can suppress noise in an audible range caused by on/off operations of the FET Q7 of the snubber circuit 50. As described above, the switching power supply device 1 can suppress noise in an audible range by control performed on software. With this configuration, the switching power supply device 1 requires neither a sound-absorbing member nor additional circuit part, thereby requiring a smaller number of parts. Consequently, the switching power supply device 1 can be downsized and manufactured at a lower cost.

In the switching power supply device 1, the on-duty lower limit Dth is equal to or larger than the actual on-duty D2 of the FET Q7 capable of outputting the snubber current minimum value α, which is the minimum value of an electric current output from the snubber circuit 50. With this configuration, the switching power supply device 1 can more appropriately set the on-duty lower limit Dth.

If the actual on-duty D2 at which the FET Q7 is turned on based on the surge power is smaller than the on-duty lower limit Dth, the controller 80 in the switching power supply device 1 turns on the FET Q7 at the on-duty lower limit Dth. With this configuration, when the surge power is relatively small, the switching power supply device 1 can cause the FET Q7 of the snubber circuit 50 to operate at a desired frequency.

The switching power supply device 1 has the discontinuous current mode in which the electric current flowing through the snubber inductor 51 discontinuously flows. The controller 80 can set the on-duty lower limit Dth in at least the discontinuous current mode. With this configuration, the switching power supply device 1 can control the FET Q7 of the snubber circuit 50 at the on-duty lower limit Dth depending on the continuous current mode or the discontinuous current mode.

Modifications

The following describes modifications of the embodiment. While the controller 80 can control the FET Q7 at the on-duty lower limit Dth in both of the continuous current mode and the discontinuous current mode in the description above, the embodiment is not limited thereto. The controller 80 may be able to control the FET Q7 at the on-duty lower limit Dth only in the discontinuous current mode.

The controller 80 may be able to control the FET Q7 at respective on-duty lower limits Dth in the continuous current mode and the discontinuous current mode.

While the on-duty lower limit Dth is equal to the actual on-duty D2 of the FET Q7 capable of outputting the snubber current minimum value α from the snubber circuit 50 in the description above, the embodiment is not limited thereto. The on-duty lower limit Dth may be a value demonstrated not to generate noise in an audible range by a simulation, for example.

The FETs Q1 to Q4 of the switching circuit 10 are not limited to MOSFETs and may be switching elements, such as insulated gate bipolar transistors (IGBTs).

The FETs Q5 and Q6 of the rectifier circuit 30 are not limited to MOSFETs and may be rectifier elements, such as diodes.

When the surge power is relatively small, the switching power supply device according to the present embodiment can cause the switching element of the snubber circuit to operate at the on-duty lower limit, thereby suppressing intermittent operations of the switching element. As a result, the switching power supply device can suppress noise in an audible range caused by on/off operations of the switching element.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A switching power supply device comprising:
   a switching circuit configured to convert DC power supplied from a DC power supply into AC power;
   a rectifier circuit including a plurality of rectifier elements configured to rectify the AC power resulting from conversion by the switching circuit;
   a snubber circuit including a power storage element configured to store therein surge power due to a reverse recovery time of the rectifier elements, a switching element configured to discharge the surge power stored in the power storage element, and an inductor provided in a stage following the switching element; and
   a controller configured to control an on-duty at which the switching element is turned on based on the surge power, wherein
   the controller is capable of setting an on-duty lower limit indicating a lower limit of the on-duty, and
   the on-duty lower limit is smaller than the on-duty set for the switching element in a continuous current mode in which an electric current flowing through the inductor continuously flows and larger than 0, and wherein
   the on-duty lower limit is equal to or larger than the on-duty of the switching element capable of outputting a snubber current minimum value serving as a minimum value of an electric current output from the snubber circuit.

2. The switching power supply device according to claim 1, wherein,
   when the on-duty at which the switching element is turned on based on the surge power is smaller than the on-duty lower limit, the controller turns on the switching element at the on-duty lower limit.

3. The switching power supply device according to claim 1, wherein, when the on-duty at which the switching element is turned on based on the surge power is smaller than the on-duty lower limit, the controller turns on the switching element at the on-duty lower limit.

4. The switching power supply device according to claim 1, wherein
   the controller has a discontinuous current mode in which the electric current flowing through the inductor discontinuously flows and is capable of setting the on-duty lower limit in at least the discontinuous current mode.

5. The switching power supply device according to claim 1, wherein the controller has a discontinuous current mode in which the electric current flowing through the inductor discontinuously flows and is capable of setting the on-duty lower limit in at least the discontinuous current mode.

6. The switching power supply device according to claim 3, wherein
   the controller has a discontinuous current mode in which the electric current flowing through the inductor discontinuously flows and is capable of setting the on-duty lower limit in at least the discontinuous current mode.

* * * * *